US012022862B2

(12) United States Patent
Fernando et al.

(10) Patent No.: US 12,022,862 B2
(45) Date of Patent: Jul. 2, 2024

(54) DEVICE FOR HEATING AEROSOL-FORMING SUBSTRATE WITH AIR PREHEAT

(71) Applicant: PHILIP MORRIS PRODUCT S.A., Neuchâtel (CH)

(72) Inventors: Felix Fernando, Old Basing (GB); Ana Isabel Gonzalez Florez, Neuchâtel (CH)

(73) Assignee: Philip Morris Products S.A., Neuchâtel (CH)

( * ) Notice: Subject to any disclaimer, the term of this patent is extended or adjusted under 35 U.S.C. 154(b) by 759 days.

(21) Appl. No.: 15/734,311

(22) PCT Filed: Jun. 3, 2019

(86) PCT No.: PCT/IB2019/054573
§ 371 (c)(1),
(2) Date: Dec. 2, 2020

(87) PCT Pub. No.: WO2019/234582
PCT Pub. Date: Dec. 12, 2019

(65) Prior Publication Data
US 2021/0219618 A1 Jul. 22, 2021

(30) Foreign Application Priority Data
Jun. 5, 2018 (EP) .................................... 18176166

(51) Int. Cl.
*A24F 1/30* (2006.01)
*A24F 40/42* (2020.01)
(Continued)

(52) U.S. Cl.
CPC ................ *A24F 1/30* (2013.01); *A24F 40/42* (2020.01); *A24F 40/46* (2020.01); *A24F 40/465* (2020.01);
(Continued)

(58) Field of Classification Search
CPC . A24F 1/30; A24F 40/10; A24F 40/42; A24B 15/167
See application file for complete search history.

(56) References Cited

U.S. PATENT DOCUMENTS 7,350,721 B2 4/2008 Ghazarian
11,602,163 B2 * 3/2023 Gonzalez Florez .... A24F 40/10
(Continued)

FOREIGN PATENT DOCUMENTS

CN 204377917 U 6/2015
CN 104921306 A 9/2015
(Continued)

OTHER PUBLICATIONS

Russian Office Action for RU 2020138674, issued by the Patent Office of the Russian Federation dated Sep. 17, 2022; 15 pgs. including English translation.
(Continued)

*Primary Examiner* — Abdullah A Riyami
*Assistant Examiner* — Nader J Alhawamdeh
(74) *Attorney, Agent, or Firm* — Mueting Raasch Group

(57) ABSTRACT

A device (100) for heating an aerosol-forming substrate includes a heater (160), a receptacle inlet (143) and outlet (147), and an air inlet channel (170). The heater includes a heating element, an internal surface, and an external surface. The internal surface defines at least a portion of a receptacle (140) configured to receive the aerosol-forming substrate or a cartridge comprising the aerosol-forming substrate. The receptacle inlet is in communication with, and upstream of, the receptacle. The receptacle outlet is in communication with, and downstream of, the receptacle. The air inlet channel is in communication with an ambient environment and the receptacle inlet. The air inlet channel defines a tortuous path between the ambient environment and the
(Continued)

receptacle inlet. The air inlet channel is positioned relative to the heater to cause air in the tortuous path to be heated by the heater.

14 Claims, 3 Drawing Sheets

(51) Int. Cl.

| | |
|---|---|
| ***A24F 40/46*** | (2020.01) |
| ***A24F 40/465*** | (2020.01) |
| ***A24F 40/48*** | (2020.01) |
| ***A24F 40/485*** | (2020.01) |
| ***A24F 40/57*** | (2020.01) |
| ***H05B 3/00*** | (2006.01) |
| *A24F 40/20* | (2020.01) |

(52) U.S. Cl.
CPC ............ *A24F 40/48* (2020.01); *A24F 40/485* (2020.01); *A24F 40/57* (2020.01); *H05B 3/0014* (2013.01); *A24F 40/20* (2020.01); *H05B 2203/022* (2013.01)

(56) References Cited

U.S. PATENT DOCUMENTS

| | | | | |
|---|---|---|---|---|
| 2016/0249677 | A1 | 9/2016 | Bishara | |
| 2017/0099873 | A1* | 4/2017 | Benjamignan | H01M 10/425 |
| 2017/0164653 | A1 | 6/2017 | Chen | |
| 2017/0251718 | A1* | 9/2017 | Armoush | A24F 40/40 |
| 2017/0265521 | A1* | 9/2017 | Do | A24F 1/30 |
| 2020/0196662 | A1 | 6/2020 | Fernando | |
| 2020/0329760 | A1* | 10/2020 | Gonzalez Florez | A24F 40/10 |
| 2021/0219618 | A1* | 7/2021 | Fernando | A24F 40/42 |
| 2021/0259307 | A1* | 8/2021 | Pijnenburg | A24B 15/167 |

FOREIGN PATENT DOCUMENTS

| | | | |
|---|---|---|---|
| EP | 3260001 | A1 | 12/2017 |
| JP | 2017522873 | A | 8/2017 |
| RU | 2602053 | C2 | 11/2016 |
| WO | WO 2013/102609 | A2 | 7/2013 |
| WO | WO 2014/102092 | A1 | 7/2014 |
| WO | WO 2015/177255 | A1 | 11/2015 |
| WO | WO 2016/005600 | A1 | 1/2016 |
| WO | WO 2018/045176 | A1 | 3/2018 |

OTHER PUBLICATIONS

International Search Report and Written Opinion for PCT/IB2019/054573, issued by the European Patent Office, dated Sep. 27, 2019; 9 pgs.

European Search Report for EP18176166, issued by the European Patent Office, dated Jan. 2, 2019; 7 pgs.

Japanese Office Action for JP 2020-567604 issued by the Japanese Patent Office dated Aug. 14, 2023; 8 pgs. Including English translation.

Chinese Office Action for CN Application No. 201980035732.5 issued by the China National Intellectual Property Administration dated Nov. 29, 2023; 12 pgs. Including English translation.

* cited by examiner

DEVICE FOR HEATING AEROSOL-FORMING SUBSTRATE WITH AIR PREHEAT

This application is the § 371 U.S. National Stage of International Application No. PCT/M2019/054573, filed 3 Jun. 2019, which claims the benefit of European Application No. 18176166.9, filed 5 Jun. 2018.

The present disclosure relates to an aerosol-generating element for generating an aerosol from an aerosol-forming substrate. More particularly, this disclosure relates to aerosol-generating elements for generating an aerosol from an aerosol-forming substrate without combusting the aerosol-forming substrate and to devices, such as shisha devices, that include such heaters.

Traditional shisha devices employ charcoal to heat or combust a tobacco substrate to generate an aerosol for inhalation by a user. High levels of carbon monoxide and combustion by-products are produces during use of traditional shisha device. The carbon monoxide may be generated by the charcoal as well as the combustion of the tobacco substrate.

One way to reduce the production of carbon monoxide and combustion by-products is to use electric heaters that heat the tobacco substrate to a temperature sufficient to produce an aerosol from the substrate without combusting the substrate.

To preserve as much as possible the ritual, flavors, and aromas of traditional shisha devices, electronic shisha devices should mimic, as closely as possible, the thermal profile of the substrate in a traditional shisha device. However, it may be difficult for electric heaters to heat air to temperatures achieved in charcoal operated shisha devices. The actual temperature of the air in charcoal operated shisha devices is roughly equivalent to the temperature of the glowing charcoal, which may be up to about 700° C. Supporting such a high temperature of air is not practical for most electrically heated shisha devices, in particular battery powered shisha devices.

Bringing the air temperatures closer to the heater temperature may help ensure a more homogenous thermal gradient in the substrate and may provide for more traditional flavors and aromas to be experiences from electrically heated shisha devices.

Electrically heated shisha devices that employ pre-heated air may employ an airflow path such that the air travels in the vicinity of the heat source upon puffing. However, such devices may not sufficiently pre-heat the air. For example, the air may flow past the heater in laminar fashion. In laminar flow, the number of air molecules that contact a hot surface may be limited to those air molecules at the edge of the flow, resulting in ineffective heating of those air molecules towards the center of the flow.

It is desirable to provide an electric heater for a shisha device that more closely mimics a thermal profile of the substrate in a traditional shisha device.

It is also desirable to provide an electric heater for a shisha device that heats the aerosol-forming substrate efficiently.

In various aspects of the present invention there is provided a device for heating an aerosol-forming substrate. The device comprises a heater comprising a heating element, an internal surface, and an external surface. The internal surface defines at least a portion of a receptacle configured to receive the aerosol-forming substrate or a cartridge comprising the aerosol-forming substrate. The device further comprises a receptacle inlet and a receptacle outlet. The receptacle inlet is in communication with, and upstream of, the receptacle. The receptacle outlet is in communication with, and downstream of, the receptacle. The device also includes an air inlet channel in communication with an ambient environment and the receptacle inlet. The air inlet channel defines a tortuous path between the ambient environment and the receptacle inlet. The air inlet channel is positioned relative to the heater to cause air in the tortuous path to be heated by the heater. For example, at least a portion of the air inlet channel may be defined by the external surface of the heater. The tortuous path of the air inlet channel exchanges heat between the heater and air in the air inlet channel Various aspects or embodiments of the devices, such as shisha devices, including the electric heaters described herein may provide one or more advantages relative to existing devices. For example, shisha devices described herein may more closely mimic thermal profiles of an aerosol-forming substrate in traditional shisha devices which should allow a user of the electrically heated shisha device to obtain a more traditional shisha experience. The walls of the air inlet channel exchange heat from the heater to the air, taking heat away from the external surface of the heater. The preheated air helps to promote aerosolization of the aerosol-forming substrate being heated, as well as reducing the time to first puff after activating the heater. The tortuous path of the air inlet channel functions as a heat exchange surface, which allows devices employing the aerosol-generating elements described herein to more closely mimic mimics a thermal profile of the substrate in a traditional shisha device.

The tortuous path of the air inlet channel increases turbulent flow and thus causes more collisions of air molecules with hot surfaces of the channel resulting in greater heating of the surface than with laminar flow through straight channels. In addition, the surface area of the air inlet channel that is positioned relative to the heater may be increased, relative to a straight channel, and may also serve to enhance heating of the air through the tortuous path. As such, the air may be heated to a greater extent than air that follows a straight path in the vicinity of the heater. The tortuous path may comprise one or both of a serpentine path and a helical path.

The air inlet channel may comprise protuberances that extend into the channel to cause mixing of air flowing through the channel. The protuberances may be in the form of a rough or inhomogeneous surface, protrusions, fins, or the like. The mixing of the air may cause turbulent flow and allow more air molecules to contact a hot surface of the channel and thus cause direct heating The device may further comprise a sleeve disposed around the heater. The sleeve has a body that defines at least a portion of the air inlet channel. The sleeve may comprise a thermally conductive material to facilitate transfer of heat from the sleeve to air flowing through the air inlet channel. For example, the sleeve may comprise aluminium or alumina. In some embodiments, the sleeve comprises alumina ceramic material.

The device may include a reservoir to heat air between puffs prior to moving through the air inlet channel or the tortuous path of the air inlet channel, further increasing air temperature before the preheated air interacts with the aerosol-forming substrate and further increasing heating efficiency of the device. In some embodiments, an exterior wall of the reservoir and reservoir inlet are formed by a housing. The housing may be disposed about the heating element to form a reservoir between the housing and the heating element. If the device comprises a sleeve, the housing may be disposed about the sleeve. Preferably, the sleeve, of present, is thermally conductive. Air in the reservoir may be heated by the heater or the thermally conductive sleeve. The air in the reservoir may be heated between puffs. Preferably, the volume of the reservoir is about the expected volume of a puff of the device. For a shisha device, the volume of a puff may be in the range of about 400 ml to about 650 ml. The device may be configured such that air may flow through the housing inlet to the reservoir, from the reservoir to the air inlet channel, and from the air inlet channel to the receptacle. In some embodiments, the exterior wall of the reservoir and the reservoir inlet are formed by a reservoir sleeve disposed about the heater and the tortuous path of air inlet channel or the sleeve forming the tortuous path of the air inlet channel.

The devices for heating an aerosol-forming substrate described herein may be any suitable device, such as a shisha device. Preferably, the devices are heat-non-burn devices in which the aerosol-forming substrate is sufficiently heated to produce an aerosol without combusting the substrate. The devices comprise an electric heater. The heater may comprise a heating element and a heating block. The heater comprises an external surface and an internal surface that defines a receptacle configured to receive an aerosol-forming substrate or a cartridge containing the aerosol-forming substrate. The receptacle is configured to receive an aerosol-forming substrate or a cartridge containing the aerosol-forming substrate. The receptacle has an inlet and an outlet to allow air to flow through from the inlet, through the receptacle and through or across the aerosol-forming substrate in the receptacle, and to the outlet. The heater heats the aerosol-forming substrate to cause the substrate to form an aerosol, which may be entrained in air flowing from the inlet to the outlet.

The heater may comprise any suitable heating element. For example, the heating element may comprise one or both of resistive and inductive heating components. Preferably, the heating element comprises a resistive heating component. For example, the heating element may comprise one or more resistive wires or other resistive elements. The resistive wires may be in contact with a thermally conductive material to distribute heat produced over a broader area. Examples of suitable conductive materials include aluminium, copper, zinc, nickel, silver, and combinations thereof. For purposes of this disclosure, if resistive wires are in contact with a thermally conductive material, both the resistive wires and the thermally conductive material are part of the heating element that forms at least a portion of the surface of the cartridge receptacle.

In some examples, a heating element comprises an inductive heating element. For example, the heating element may comprise a susceptor material that forms a surface of the cartridge receptacle. As used herein, the term 'susceptor' refers to a material that is capable to convert electromagnetic energy into heat. When located in an alternating electromagnetic field, typically eddy currents are induced and hysteresis losses may occur in the susceptor causing heating of the susceptor. As the susceptor is located in thermal contact or close thermal proximity with the aerosol-forming substrate, the substrate is heated by the susceptor such that an aerosol is formed. Preferably, the susceptor is arranged at least partially in direct physical contact with the aerosol-forming substrate or the cartridge containing the aerosol-forming substrate.

The susceptor may be formed from any material that can be inductively heated to a temperature sufficient to generate an aerosol from the aerosol-forming substrate. Preferred susceptors comprise a metal or carbon. A preferred susceptor may comprise or consist of a ferromagnetic material, for example ferritic iron, a ferromagnetic alloy, such as ferromagnetic steel or stainless steel, and ferrite. A suitable susceptor may be, or comprise, aluminium.

Preferred susceptors are metal susceptors, for example stainless steel. However, susceptor materials may also comprise or be made of graphite, molybdenum, silicon carbide, aluminium, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

A susceptor preferably comprises more than 5%, preferably more than 20%, preferably more than 50% or 90% of ferromagnetic or paramagnetic materials. Preferred susceptors may be heated to a temperature in excess of 250 degrees Celsius. Suitable susceptors may comprise a non-metallic core with a metal layer disposed on the non-metallic core, for example metallic tracks formed on a surface of a ceramic core.

The shisha device may also comprise one or more induction coil configured to induce eddy currents and/or hysteresis losses in a susceptor material, which results in heating of the susceptor material. A susceptor material may also be positioned in the cartridge containing the aerosol generating substrate. A susceptor element comprising the susceptor material may comprise any suitable material, such as those described in, for example, PCT Published Patent Applications WO 2014/102092 and WO 2015/177255.

The heating element, whether an inductive heating element or a susceptor, may be thermally coupled with a heating block. The heating element may be in direct contact with the heating block. The heating block may comprise any suitable thermally conductive material. In some embodiments, the heating block comprises aluminium, alumina, or an alumina ceramic. The heating block may form the exterior surface of the heater.

The shisha device may comprise control electronics operably coupled to the resistive heating element or induction coil. The control electronics are configured to control heating of the heating element.

The control electronics may be provided in any suitable form and may, for example, include a controller or a memory and a controller. The controller may include one or more of an Application Specific Integrated Circuit (ASIC) state machine, a digital signal processor, a gate array, a microprocessor, or equivalent discrete or integrated logic circuitry. Control electronics may include memory that contains instructions that cause one or more components of the circuitry to carry out a function or aspect of the control electronics. Functions attributable to control electronics in this disclosure may be embodied as one or more of software, firmware, and hardware.

The electronic circuitry may comprise a microprocessor, which may be a programmable microprocessor. The electronic circuitry may be configured to regulate a supply of power. The power may be supplied to the heater element or induction coil in the form of pulses of electrical current.

If the heating element is a resistive heating element, the control electronics may be configured to monitor the electrical resistance of the heating element and to control the supply of power to the heating element depending on the electrical resistance of the heating element. In this manner, the control electronics may regulate the temperature of the resistive element.

If the heating components comprise an induction coil and the heating element comprises a susceptor material, the control electronics may be configured to monitor aspect of the induction coil and to control the supply of power to the induction coil depending on the aspects of the coil such as described in, for example, WO 2015/177255. In this manner, the control electronics may regulate the temperature of the susceptor material.

The shisha device may comprise a temperature sensor, such as a thermocouple, operably coupled to the control electronics to control the temperature of the heating elements. The temperature sensor may be positioned in any suitable location. For example, the temperature sensor may be configured to insert into a cartridge received within the receptacle to monitor the temperature of the aerosol-forming substrate being heated. In addition or alternatively, the temperature sensor may be in contact with the heating element. In addition or alternatively, the temperature sensor may be positioned to detect temperature at an outlet of the heater receptacle. The sensor may transmit signals regarding the sensed temperature to the control electronics, which may adjust heating of the heating elements to achieve a suitable temperature at the sensor.

Regardless of whether the shisha device includes a temperature sensor, the device is preferably configured to heat an aerosol generating substrate in a cartridge received in the receptacle to an extent sufficient to generate an aerosol without combusting the aerosol generating substrate.

The control electronics may be operably coupled to a power supply. The shisha device may comprise any suitable power supply. For example, a power supply of a shisha device may be a battery or a set of batteries. The batteries of power supply unit can be rechargeable and may be removable and replaceable. Any suitable battery may be used. For example, heavy duty type or standard batteries existing in the market, such as used for industrial heavy duty electrical power-tools. Alternatively, the power supply unit can be any type of electric power supply including a super or hyper-capacitor. Alternatively, the device can be powered connected to an external electrical power source, and electrically and electronically designed for such purpose. Regardless of the type of power supply employed, the power supply preferably provides sufficient energy for the normal functioning of the device for approximately 70 minutes of continuous operation of the device, before being recharged or needing to connect to an external electrical power source.

The device comprises an air inlet channel in communication with an ambient environment external to the device and in communication with the receptacle inlet. The air inlet channel defines a tortuous path. The air inlet channel is positioned relative to the heater to cause air in the tortuous path to be heated by the heater. In some embodiments, the external surface of the heater defines at least a portion of the tortuous path of the air inlet channel. An external surface of the heating block may be the external surface of the heater that defines at least a portion of the tortuous path. An external surface of the heater is a surface of the heater that is opposite the surface that forms the receptacle. As air flows through the tortuous path of the channel, the air is preheated prior to entering the receptacle inlet.

The air inlet channel is preferably formed from a thermally conductive material so that air that contacts a wall of the channel may be efficiently heated. The air inlet channel may be formed from any suitable thermally conductive material. Preferably, the walls of the air inlet channel comprise aluminium, alumina, or an alumina ceramic.

The tortuous path of the air inlet channel may have any suitable shape. In some embodiments, the tortuous path has a serpentine shape. In some embodiments, the tortuous path has a helical shape. In some embodiments, the tortuous path comprises a portion having a helical shape and a portion having a serpentine shape. The tortuous path may extend the length of the inlet channel by any suitable degree relative to a straight path. For example, the length of the tortuous path may be 5 times or more longer than a straight path, such as 10 times or more longer than a straight path, or 20 times or more longer than a straight path. The tortuous path may be less than 100 times longer than a straight path. By extending the length relative to a straight path, the tortuous path increases the surface area over which air traveling through the channel in the path may be heated.

The tortuous path may be configured to introduce turbulence as air flows through the path. For example, curvature, bends, or other geometries of the path may result in turbulence.

Turbulence enhances heat exchange between the air in the channel and the walls of the channel relative to laminar flow because the number of air molecules that contact the walls of the channel is increased with turbulent flow relative to laminar flow.

The air inlet channel may comprise one or more protuberances to increase turbulence as air flows through the channel. For example, the air inlet channel may comprise one or more if any of, or any combination of baffles, plates, fins, bumps, rough or inhomogeneous surfaces, or other features configured to induce turbulence. Preferably, the air flow through the tortuous path of the air inlet channel is turbulent.

The air inlet channel may have any suitable cross-sectional dimensions. Preferably, the width or diameter of the channel is configured to achieve suitable resistance to draw (RTD) through the device. The RTD of a specimen refers to the static pressure difference between the two ends of the specimen when it is traversed by an air flow under steady conditions in which the volumetric flow is 17.5 millilitres per second at the output end. The RTD of a specimen can be measured using the method set out in ISO Standard 6565:2002 with any ventilation blocked. For example, the air inlet channel may have a diameter or width in a range from about 3 mm to about 10 mm. Preferably, the air inlet channel has a diameter or width in a range from about 4 mm to about 8 mm. More preferably, the air inlet channel has a diameter or width of about 5 mm. Preferably, the RTD through the device, when no capsule or aerosol-forming substrate is present in the receptable is in a range less than about 60 mm $H_2O$, such as between about 10 mm $H_2O$ and about 50 mm $H_2O$, or from about 20 mm$H_2O$ to about 40 mm $H_2O$.

In some embodiments, the air inlet channel is formed between the exterior surface of the heater a surface of a sleeve disposed about the heater. The sleeve has a body that defines the tortuous path between the sleeve and the heater. The sleeve may be in close proximity or in contact with the heater. For example, the sleeve may be in close proximity or in contact with the heating block. Preferably, the sleeve is formed from thermally conductive material. In some embodiments, the sleeve comprises aluminium, alumina or an alumina ceramic. Preferably, the sleeve achieves thermal equilibrium with the heater between puffs. For example, the sleeve may achieve thermal equilibrium with the heating block between puffs. In some embodiments, the sleeve and the heating block are formed from the same material or materials.

Air flowing through the fresh air inlet channel may be heated by any suitable amount. In some examples, the air will be sufficiently heated to cause an aerosol to form when the heated air flows through the receptacle and contacts the-aerosol forming substrate in the receptacle or in a cartridge in the receptacle. In some examples, the air is not sufficiently heated to cause aerosol formation on its own but facilitates heating of the aerosol-forming substrate by the heating element. Preferably, the amount of energy supplied to the heating element to heat the substrate and cause aerosol formation is reduced by 5% or more, such as 10% or more, or 15% or more, when the air is pre-heated in accordance with the present invention, relative to designs in which air is not pre-heated. Typically, the energy savings will be less than 75%.

The substrate is preferably heated, through, for example, a combination of the preheated air and heating from the heating elements, to a temperature in a range from about 150° C. to about 300° C.; more preferably from about 180° C. to about 250° C. or from about 200° C. to about 230° C.

To achieve such substrate temperatures, the heating element may be heated to a working temperature from about 150° C. to about 250° C.; preferably from about 180° C. to about 230° C. or from about 200° C. to about 230° C.

The device may comprise a reservoir formed between a housing or a reservoir sleeve and the heater. If the device includes a sleeve forming at least the tortuous path of the air inlet channel, the reservoir may be formed between the housing and the reservoir sleeve and the sleeve forming the tortuous path of the air inlet channel. The reservoir includes a reservoir inlet that is in communication with the air inlet channel. Preferably, air in the reservoir is heated by the heater or via a thermally conductive sleeve between puffs. Preferably, the volume of the reservoir is about the expected volume of a puff of the device. Accordingly, the entire or majority of the volume of air in a puff may be preheated in the reservoir between puffs. During a puff the air from the reservoir may travel through the tortuous path of the air inlet channel to be further heated prior to flowing through the reservoir inlet.

For a shisha device, the reservoir may have a volume from about 400 ml to about 650 ml, such as from about 450 ml to about 600 ml, or from about 500 ml to about 550 ml, or about 530 ml, which is an expected volume of a puff on a shisha device.

Preferably at least a portion of the reservoir comprises a heat shield. The heat shield and the sleeve or the exterior surface of the heater may form opposing surfaces of the reservoir. Any suitable heat shield material may be employed. Preferably, the heat shield material comprises a surface that is thermally reflective. The thermally reflective surface may be backed with an insulating material. In some examples, the thermally reflective material comprises an aluminium metalized film or other suitable thermally reflective material. In some examples, the insulating material comprises a ceramic material. In some examples, the heat shield comprises an aluminium metalized film and a ceramic material backing.

The receptacle inlet may comprise any suitable number of apertures in communication with one or more air inlet channels. For example, the receptacle may comprise 1 to 1000 apertures, such as 10 to 500 apertures. The apertures may be of uniform size or non-uniform size. The apertures may be uniformly distributed or non-uniformly distributed. The apertures may be formed in the receptacle at any suitable location. For example, the apertures may be formed in one or both of a top or a sidewall of the receptacle. Preferably, the apertures are formed in the top of the receptacle. The apertures may be formed by a manifold.

The receptacle is preferably shaped and sized to allow contact between one or more wall or ceiling of the receptacle and the cartridge when the cartridge is received by the receptacle to facilitate conductive heating of the cartridge and aerosol generating substrate by the heater forming a surface of the receptacle. In some examples, an air gap may be formed between at least a portion of the cartridge and a surface of the receptacle, where the air gaps serve as a portion of the fresh air inlet channel.

Preferably, the interior of the receptacle and the exterior of the cartridge are of similar size and dimensions. Preferably, the interior of the receptacle and the exterior of the cartridge has a height to a base width (or diameter) ratio of greater than about 1.5 to 1 or a base width (or diameter) ratio of greater than about 1.5 to 1. Such ratios may allow for more efficient depletion of the aerosol generating substrate within the cartridge during use by allowing heat from the heater to penetrate to the middle of the cartridge. For example, the receptacle and cartridge may have a base diameter (or width) about 1.5 to about 5 times the height, or about 1.5 to about 4 times the height, or about 1.5 to about 3 times the height. Similarly, the receptacle and cartridge may have a height about 1.5 to about 5 times the base diameter (or width), or about 1.5 to about 4 times the base diameter (or width), or about 1.5 to about 3 times the base diameter (or width). Preferably, the receptacle and cartridge have a height to base diameter ratio or base diameter to height ratio of from about 1.5 to 1 to about 2.5 to 1.

In some examples, the cartridge containing the aerosol-forming substrate has a ratio of heatable surface area to volume in a range from about 1 $cm^{-1}$ to about 4 $cm^{-1}$.

In some examples, the interior of the receptacle and the exterior of the cartridge has a height in a range from about 20 mm to about 60 mm, such as from about 30 mm to about 50 mm, or about 40 mm and a base diameter in a range from about 10 mm to about 50 mm, such as from about 20 mm to about 30 mm, or about 25 mm.

The receptacle may be formed from one or more parts, at least one of which is the heater. Preferably, the receptacle is formed by two or more parts. Preferably, at least one part of the receptacle is movable relative to another part to allow access to the interior of the receptacle for inserting the cartridge into the receptacle. For example, one part may be removably attachable to another part to allow insertion of the cartridge when the parts are separated. The parts may be attachable in any suitable manner, such as through threaded engagement, interference fit, snap fit, or the like. In some examples, the parts are attached to one another via a hinge. When the parts are attached via a hinge, the parts may also include a locking mechanism to secure the parts relative to one another when the receptacle is in a closed position. In some examples, the receptacle comprises a drawer that may be slid open to allow the cartridge to be placed into the drawer and may be slid closed to allow the shisha device to be used.

Any suitable cartridge may be used with a device as described herein. Preferably, the cartridge comprises a thermally conductive housing. For example, the housing may be formed from aluminium, copper, zinc, nickel, silver, and combinations thereof. Preferably, the housing is formed from aluminium. In some examples, the cartridge is formed from one or more material less thermally conductive than aluminium. For example, the housing may be formed from any suitable thermally stable polymeric material. If the material is sufficiently thin sufficient heat may be transferred through the housing despite the housing being formed from material that is not particularly thermally conductive.

The cartridge comprises one or more apertures formed in the top and bottom of the housing to allow air flow through the cartridge when in use. If the top of the receptacle comprises one or more apertures, at least some of the apertures in the top of the cartridge may aligned with the apertures in the top of the receptacle. The cartridge may comprise an alignment feature configured to mate with a complementary alignment feature of the receptacle to align the apertures of the cartridge with the apertures of the receptacle when the cartridge is inserted into the receptacle. The apertures in the housing of the cartridge may be covered during storage to prevent aerosol generating substrate stored in the cartridge from spilling out of the cartridge. In addition or alternatively, the apertures in the housing may have dimensions sufficiently small to prevent or inhibit the aerosol generating substrate from exiting the cartridge. If the apertures are covered, a consumer may remove the cover prior to inserting the cartridge into the receptacle. In some examples, the receptacle is configured to puncture the cartridge to form apertures in the cartridge. Preferably, the receptacle is configured to puncture the top of the cartridge.

The cartridge may be of any suitable shape. Preferably, the cartridge has a frustro-conical shape.

Any suitable aerosol-forming substrate may be placed in a cartridge for use with shisha devices of the invention. The aerosol-forming substrate is preferably a substrate capable of releasing volatile compounds that may form an aerosol. The volatile compounds may be released by heating the aerosol-forming substrate. The aerosol-forming substrate may be solid or liquid or comprise both solid and liquid components. Preferably, the aerosol-forming substrate is solid.

The aerosol-forming substrate may comprise nicotine. The nicotine containing aerosol-forming substrate may comprise a nicotine salt matrix. The aerosol-forming substrate may comprise plant-based material. The aerosol-forming substrate may comprise tobacco, and preferably the tobacco containing material contains volatile tobacco flavor compounds, which are released from the aerosol-forming substrate upon heating.

The aerosol-forming substrate may comprise homogenized tobacco material.

Homogenized tobacco material may be formed by agglomerating particulate tobacco. Where present, the homogenized tobacco material may have an aerosol-former content of equal to or greater than 5% on a dry weight basis, and preferably between greater than 30% by weight on a dry weight basis. The aerosol-former content may be less than about 95% on a dry weight basis.

The aerosol-forming substrate may alternatively or additionally comprise a non-tobacco-containing material. The aerosol-forming substrate may comprise homogenized plant-based material.

The aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the aerosol-generating device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-forming substrate may comprise other additives and ingredients, such as flavorants. The aerosol-forming substrate preferably comprises nicotine and at least one aerosol-former. In a particularly preferred embodiment, the aerosol-former is glycerine.

The solid aerosol-forming substrate may be provided on or embedded in a thermally stable carrier. The carrier may comprise a thin layer on which the solid substrate deposited on a first major surface, on second major outer surface, or on both the first and second major surfaces. The carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets. The carrier may be a non-woven fabric or fiber bundle into which tobacco components have been incorporated. The non-woven fabric or fiber bundle may comprise, for example, carbon fibers, natural cellulose fibers, or cellulose derivative fibers.

In some examples, the aerosol-forming substrate is in the form of a suspension. For example, the aerosol generating substrate may comprise molasses. As used herein, "molasses" means an aerosol-forming substrate composition comprising about 20% or more sugar. For example, the molasses may comprise at least about 25% by weight sugar, such as at least about 35% by weight sugar. Typically, the molasses will contain less than about 60% by weight sugar, such as less than about 50% by weight sugar.

Aerosol-forming substrates for use with traditional shisha devices are in the form of a molasses, which may be inhomogeneous and may contain lumps and cavities. Such cavities prevent direct thermal contact between the substrate and a heated surface making thermal conduction particularly inefficient. As a consequence, electronic heated shisha devices tend to depart from traditional molasses by using, for example, e-liquids or dry stones. Due to the ratio of heated surface area to volume of the cavity of the cartridge described in the present application, more traditional aerosol-forming substrate molasses may be used to preserve the typical ritual and shisha experience while using electric heating.

Any suitable amount of the molasses may be disposed in the cavity. In some preferred embodiments, about 3 g to about 25 g of the molasses is disposed in the cavity. Preferably, from about 7 g to about 13 g of the molasses is disposed in the cavity. More preferably, about 10 g of the molasses is disposed in the cavity.

Air that enters the cartridge flows across the aerosol-forming substrate, entrains aerosol, and exits the cartridge and receptacle via the receptacle outlet. In shisha device, air and aerosol from the receptacle outlet may enter a vessel.

The shisha device may comprise any suitable vessel defining an interior volume configured to contain a liquid and defining an outlet in head-space above a liquid fill level. The vessel may comprise an optically transparent or opaque housing to allow a consumer to observe contents contained in the vessel. The vessel may comprise a liquid fill demarcation, such as a liquid fill line. The vessel housing may be formed of any suitable material. For example, the vessel housing may comprise glass or suitable rigid plastic material. Preferably, the vessel is removable from a portion of the shisha device comprising the aerosol-generation element to allow a consumer to fill or clean the vessel.

The vessel may be filled to a liquid fill level by a consumer. The liquid preferably comprises water, which may optionally be infused with one or more colorants, flavorants, or colorant and flavorants. For example, the water may be infused with one or both of botanical or herbal infusions.

Aerosol entrained in air exiting the outlet of the receptacle may travel through a conduit positioned in the vessel. The conduit may be coupled to the receptacle outlet and may have an opening below the liquid fill level of the vessel, such that aerosol flowing through the vessel flows through the opening of the conduit, then through the liquid, into headspace of the vessel and exits the headspace outlet for delivery to a consumer.

The headspace outlet may be coupled to a hose comprising a mouthpiece for delivering the aerosol to a consumer. The mouthpiece may comprise a switch activatable by a user or a puff sensor operably coupled to the control electronics of the shisha device. Preferably, the switch or puff sensor is wirelessly coupled to the control electronics. Activation of a switch or puff sensor may cause the control electronics to activate the heating element, rather than constantly supplying energy to the heating element. Accordingly, the use of a switch or puff sensor may serve to save energy relative to devices not employing such elements to provide on-demand heating rather than constant heating.

For purposes of example, one method for using a shisha device as described herein is provided below in chronological order. The vessel may be detached from other components of the shisha device and filled with water. One or more of natural fruit juices, botanicals, and herbal infusions may be added to the water for flavoring. The amount of liquid added should cover a portion of the conduit but should not exceed a fill level mark that may optionally exist on the vessel. The vessel is then reassembled to the shisha device. A portion of the receptacle may be removed or opened to allow the cartridge to be inserted into the receptacle. The receptacle is then reassembled or closed. The device may then be turned on. A user may puff from a mouth piece until a desired volume of aerosol is produced to fill the aerosol chamber (defined by the inner volume of the cover). The user may puff on the mouth piece as desired. The user may continue using the device until no more aerosol is visible in the aerosol chamber. Preferably, the device will automatically shut off when the cartridge is depleted of usable aerosol-generating substrate. Alternatively or in addition, the consumer may refill the device with a fresh cartridge after, for example, receiving the cue from the device that the consumables are depleted or nearly depleted. If refilled with a fresh cartridge, the device may continue to be used. Preferably, the shisha device may be turned off at any time by a consumer by, for example, switching off the device.

In some examples, a user may activate one or more heating elements by using an activation element on, for example, the mouthpiece. The activation element may be, for example, in wireless communication with the control electronics and may signal control electronics to activate the heating element from standby mode to full heating. Preferably, such manual activation is only enabled while the user puffs on the mouthpiece to prevent overheating or unnecessary heating of aerosol-generating substrate in the cartridge.

In some examples, the mouthpiece includes a puff sensor in wireless communication with the control electronics and puffing on the mouthpiece by a consumer causes activation of the heating elements from a standby mode to full heating.

A shisha device described herein may have any suitable air management. In one example, puffing action from the user will create a suction effect causing a low pressure inside the device which will cause external air to flow through an air inlet of the device such as a reservoir inlet or an inlet of the air inlet channel. The air may then flow into the reservoir or into the fresh air inlet channel, and into the receptacle. The air may then flow through to a cartridge in the receptacle to carry aerosol produced from the aerosol-forming substrate in the cartridge. The air with entrained aerosol then exits the outlet of the receptacle, flows through the conduit to the liquid inside the vessel. The aerosol will then bubble out of the liquid and into head space in the vessel above the level of the liquid, out the headspace outlet, and through the hose and mouthpiece for delivery to the consumer. The flow of external air and the flow of the aerosol inside the shisha device may be driven by the action of puffing from the user.

Preferably, assembly of all main parts of a shisha device assures hermetic functioning of the device. Hermetic function should assure that proper air flow management occurs. Hermetic functioning may be achieved in any suitable manner. For example, seals such as sealing rings and washers may be used to ensure hermetic sealing.

Sealing rings and sealing washers or other sealing elements may be made of any suitable material or materials. For example, the seals may comprise one or more of graphene compounds and silicon compounds. Preferably, the materials are approved for use in humans by the U.S. Food and Drug Administration.

Main parts, such as the conduit from the receptacle, a cover housing of the receptacle, and the vessel may be made of any suitable material or materials. For example, these parts may independently be made of glass, glass-based compounds, polysulfone (PSU), polyethersulfone (PES), or polyphenylsulfone (PPSU). Preferably, the parts are formed of materials suitable for use in standard dish washing machines.

In some examples, a mouthpiece of the invention incorporates a quick coupling male/female feature to connect to a hose unit.

Reference will now be made to the drawings, which depict one or more aspects described in this disclosure. However, it will be understood that other aspects not depicted in the drawings fall within the scope and spirit of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The figures are presented for purposes of illustration and not limitation. Schematic drawings presented in the figures are not necessarily to scale.

Figure 1:
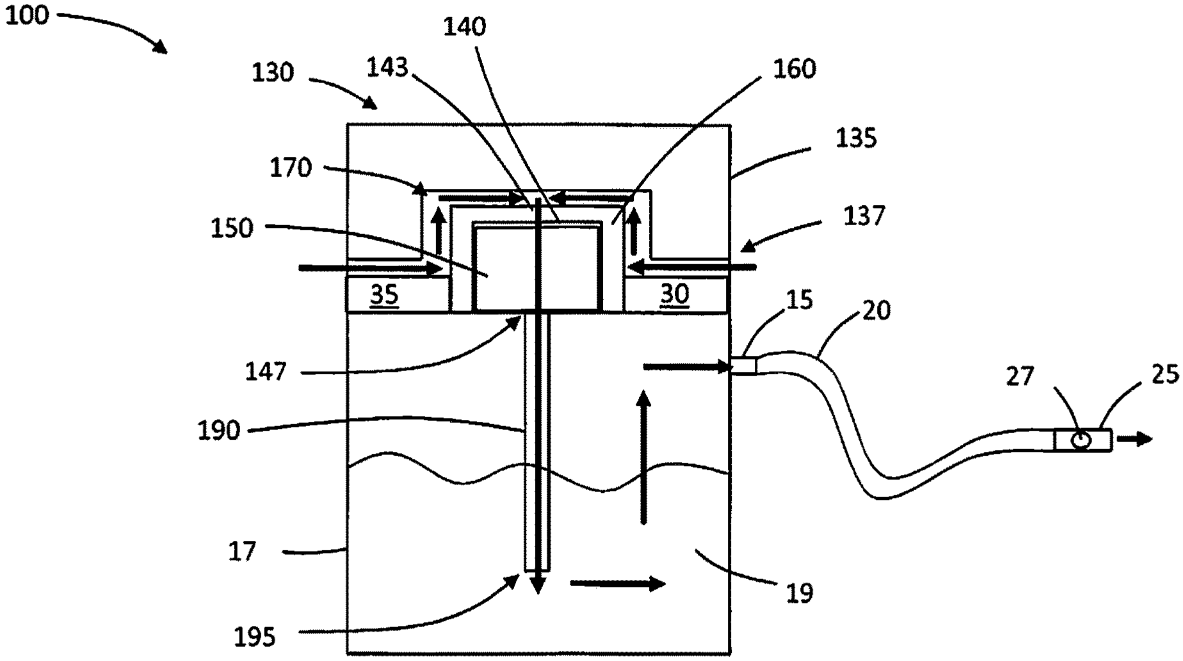
FIG. 1 is a schematic sectional view of an embodiment of a shisha device.

Referring now to FIG. 1, a schematic sectional drawing of an example of a shisha device 100 is shown. The device 100 includes a vessel 17 defining an interior volume configured to contain liquid 19 and defining a headspace outlet 15 above a fill level for the liquid 19. The liquid 19 preferably comprises water, which may optionally be infused with one or more colorants, one or more flavorants, or one or more colorants and one or more flavorants. For example, the water may be infused with one or both of botanical infusions or herbal infusions.

The device 100 also includes a heater assembly 130. The heater assembly 130 includes heater 160 defining a receptacle 140 configured to receive a cartridge 150 containing an aerosol-forming substrate. The heater assembly 130 includes an air inlet channel 170 that draws fresh air into the device 100 through inlets 137 in a housing 135. At least portion of the air inlet channel 170 is formed by, or is in proximity to, the heater 160 so that air in the channel 170 is heated before entering the receptacle 140 through receptacle inlet 143. The pre-heated air then enters the cartridge 150, which is also heated by heater 160, to carry aerosol generated by aerosol-forming substrate in the container 150. The air exits a receptacle outlet 147.

A conduit 190 carries the air and aerosol from the receptacle outlet 147 into the vessel 17 below the level of the liquid 19. The air and aerosol may bubble through the liquid 19 and exit the headspace outlet 15 of the vessel 17. A hose 20 may be attached to the headspace outlet 15 to carry the aerosol to the mouth of a user. A mouthpiece 25 may be attached or form a part of the hose 20.

The air flow path of the device, in use, is depicted by thick arrows in FIG. 1.

The mouthpiece 25 may include an activation element 27. The activation element 27 may be a switch, button or the like, or may be a puff sensor or the like. The activation element 27 may be placed at any other suitable location of the device 100. The activation element 27 may be in wireless communication with the control electronics 30 to place the device 100 in condition for use or to cause control electronics to activate the heater 160; for example, by causing power supply 35 to energize the heating element 140.

The control electronics 30 and power supply 35 may be located in any suitable position of the device 100 other than the bottom portion of the heater assembly 130 as depicted in FIG. 1.

Figure 2A:
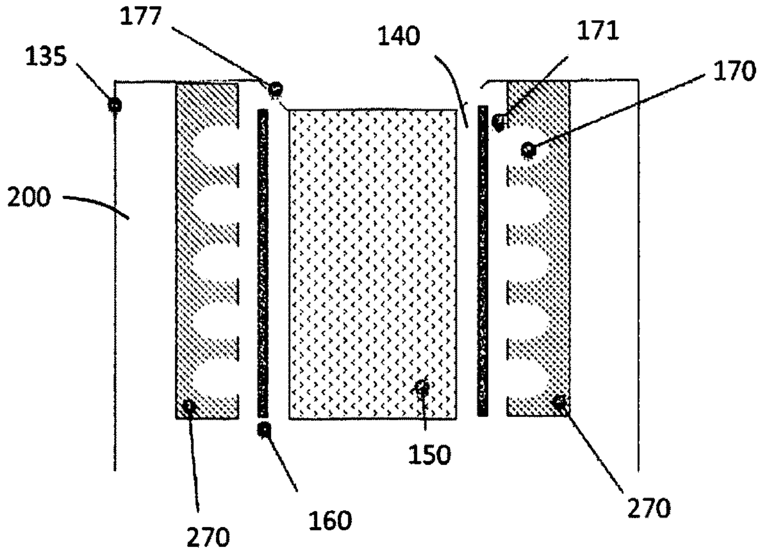
FIG. 2A is schematic sectional view of an embodiment of portion of a heating assembly and associated cartridge containing an aerosol-forming substrate.
Figure 2B:
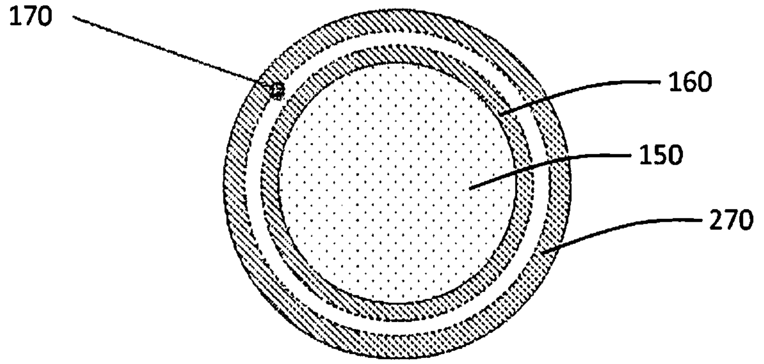
FIG. 2B is a schematic transverse sectional view of a portion of the heating assembly depicted in FIG. 2A.
Figure 2C:
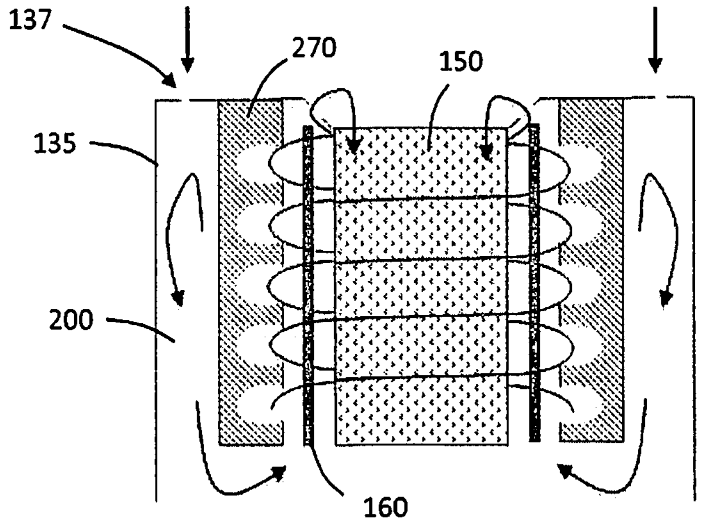
FIG. 2C is a schematic sectional view of an embodiment of portion of a heating assembly depicted in FIG. 2A, showing air flow through the assembly and associated cartridge.

FIGS. 2A-C show schematic views of a portion of a heating assembly and associated cartridge 150 disposed in receptacle 140 defined, at least in part, by heater 160. A sleeve 270 is disposed about the heater 160. The sleeve 270 has a body that defines the tortuous path of the air inlet channel 170. In the depicted embodiment, the tortuous path of the air inlet channel 170 is helical (see FIG. 2C, which shows air flow). Air in the channel 170 may be heated by the heater 160 prior to exiting a channel outlet which may serve as the receptacle inlet 177, from where the preheated air may enter the receptacle inlet (not shown) and enter the cartridge 150 containing the aerosol-forming substrate.

The sleeve 270 is positioned about 1 mm to 2 mm away from the external surface of the heater 160 to form an air gap 171 but may be in contact with the heater 160. The diameter or width of the airflow channel 170 defined by the sleeve is about 5 mm. The length of the tortuous path defined by the sleeve 270 is about 50 cm to about 60 cm depending on the number of rotations. The inner diameter of the sleeve 270 is about 35 mm. The width of the sleeve 270 is about 10 mm. The length of the heater 160 is about 40 mm.

The heating assembly has a housing 135 having an inlet 137 in communication with the air inlet channel 170 via reservoir 200. The reservoir 200 is formed between the housing 135 and the sleeve 270. The sleeve 270 is thermally conductive. Because the sleeve 270 is thermally conductive, air in the reservoir 200 may be heated. The volume of the reservoir 200 is the volume of an expected puff of the shisha device. In the depicted embodiment, the volume of the reservoir 200 is 530 ml.

Figure 3A:
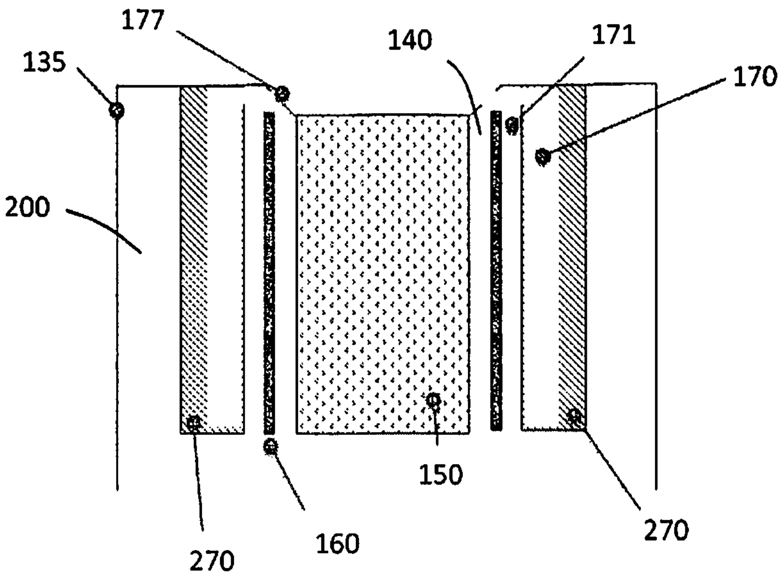
FIG. 3A is schematic sectional view of an embodiment of portion of a heating assembly and associated cartridge containing an aerosol-forming substrate.
Figure 3B:
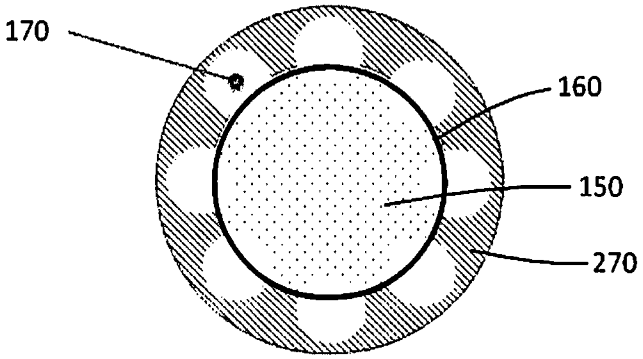
FIG. 3B is a schematic transverse sectional view of a portion of the heating assembly depicted in FIG. 3A.

FIGS. 3A-B show schematic views of a portion of a heating assembly and associated cartridge 150 disposed in receptacle 140 defined, at least in part, by heater 160. A sleeve 270 is disposed about the heater 160. The sleeve 270 has a body that defines the tortuous path of the air inlet channel 170. In the depicted embodiment, the tortuous path of the air inlet channel 170 is serpentine. Air in the channel 170 may be heated by the heater 160 prior to exiting the channel outlet 177, from where the preheated air may enter the receptacle inlet (not shown) and enter the cartridge 150 containing the aerosol-forming substrate.

The sleeve 270 is positioned about 1 mm to 2 mm away from the external surface of the heater 160 to form an air gap 171 but may be in contact with the heater 160. The diameter or width of the airflow channel 170 defined by the sleeve is about 5 mm. The length of the tortuous path defined by the sleeve 270 is about 10 cm to 40 cm depending on the number of turns. The inner diameter of the sleeve 270 is about 35 mm. The width of the sleeve 270 is about 10 mm. The length of the heater 160 is about 40 mm.

The heating assembly has a housing 135 having an inlet in communication with the air inlet channel 170 via reservoir 200. The reservoir 200 is formed between the housing 135 and the sleeve 270. The sleeve 270 is thermally conductive. Because the sleeve 270 is thermally conductive, air in the reservoir 200 may be heated. The volume of the reservoir 200 is the volume of an expected puff of the shisha device. In the depicted embodiment, the volume of the reservoir 200 is 530 ml.

The features described above in relation to one aspect of the invention may also be applicable to another aspect of the invention.

All scientific and technical terms used herein have meanings commonly used in the art unless otherwise specified. The definitions provided herein are to facilitate understanding of certain terms used frequently herein.

As used in this specification and the appended claims, the singular forms “a”, “an”, and “the” encompass embodiments having plural referents, unless the content clearly dictates otherwise.

As used in this specification and the appended claims, the term “or” is generally employed in its sense including “and/or” unless the content clearly dictates otherwise.

As used herein, “have”, “having”, “include”, “including”, “comprise”, “comprising” or the like are used in their open-ended sense, and generally mean “including, but not limited to". It will be understood that "consisting essentially of", "consisting of", and the like are subsumed in "comprising," and the like.

The words "preferred" and "preferably" refer to embodiments of the invention that may afford certain benefits under certain circumstances. However, other embodiments may also be preferred under the same or other circumstances. Furthermore, the recitation of one or more preferred embodiments does not imply that other embodiments are not useful and is not intended to exclude other embodiments from the scope of the disclosure, including the claims.

Any direction referred to herein, such as "top," "bottom," "left," "right," "upper," "lower," and other directions or orientations are described herein for clarity and brevity are not intended to be limiting of an actual device or system. Devices and systems described herein may be used in a number of directions and orientations.

The embodiments exemplified above are not limiting. Other embodiments consistent with the embodiments described above will be apparent to those skilled in the art.

The invention claimed is:

1. A device for heating an aerosol-forming substrate, comprising:

a heater comprising a heating element, an internal surface, and an external surface, wherein the internal surface defines at least a portion of a receptacle configured to receive the aerosol-forming substrate or a cartridge comprising the aerosol-forming substrate;

a receptacle inlet in communication with, and upstream of, the receptacle;

a receptacle outlet in communication with, and downstream of, the receptacle;

an air inlet channel in communication with an ambient environment and the receptacle inlet, wherein the air inlet channel defines a tortuous path between the ambient environment and the receptacle inlet, and wherein the tortuous path of the air inlet channel exchanges heat between the heater and air in the air inlet channel, wherein at least a portion of the air inlet channel is defined by the external surface of the heater.

2. The device according to claim 1, wherein the tortuous path comprises a serpentine path.

3. The device according to claim 1, wherein the tortuous path comprises a helical path.

4. The device according to claim 1, wherein the air inlet channel comprises protuberances extending in the channel.

5. The device according to claim 1, further comprising a sleeve disposed about the heater, wherein the sleeve comprises a body that defines at least a portion of the air inlet channel.

6. The device according to claim 5, wherein the sleeve comprises a thermally conductive material.

7. The device according to claim 6, wherein the thermally conductive material comprises aluminium or alumina.

8. The device according to claim 1 further comprising a reservoir in communication with the air inlet channel, wherein the device is configured such that air may flow into the reservoir, from the reservoir to the air inlet channel, and from the air inlet channel to the receptacle.

9. The device according to claim 8, wherein the device comprises a housing and a housing inlet, wherein the housing inlet is in communication with the air inlet channel, wherein the housing is disposed about the heating element to form said reservoir between the housing and the heating element, wherein the device is configured such that air may flow through the housing inlet to the reservoir, from the reservoir to the air inlet, and from the air inlet channel to the receptacle.

10. The device according to claim 8, wherein the volume of the reservoir is about the same as the expected volume of a puff of a user of the device.

11. The device according to claim 1, wherein the device is a shisha device further comprising:

a vessel configured to contain liquid, the vessel comprising a headspace above a liquid fill level and comprising a vessel outlet in communication with the headspace; and a conduit extending from the receptacle outlet into the vessel to below the liquid fill level.

12. The device according to claim 1, further comprising a power supply and control electronics operably coupled to the heating element, wherein the control electronics are configured to control the temperature of the heating element such that the heater heats, but does not combust, the aerosol-forming substrate.

13. A system comprising:

the device according to claim 1; and a cartridge comprising aerosol-forming substrate, wherein the cartridge is configured to be received by the receptacle of the heater of the device.

14. The system according to claim 13, wherein the aerosol-forming substrate comprises tobacco.

* * * * *